UNITED STATES PATENT OFFICE.

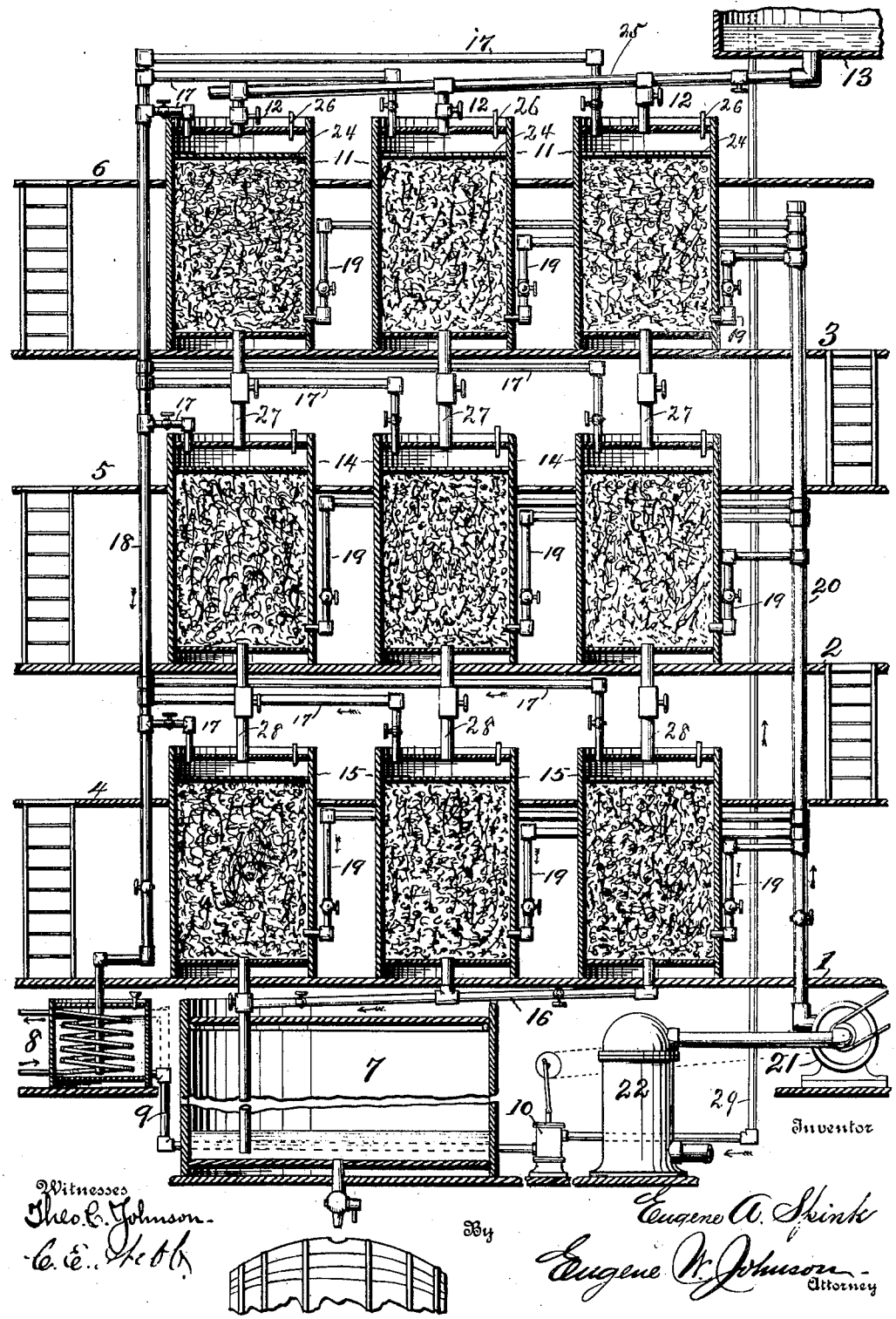

EUGENE A. SPINK, OF CHICAGO, ILLINOIS.

APPARATUS FOR MAKING VINEGAR.

No. 863,950.          Specification of Letters Patent.          Patented Aug. 20, 1907.

Application filed December 17, 1906. Serial No. 348,325.

*To all whom it may concern:*

Be it known that I, EUGENE A. SPINK, a citizen of the United States of America, and a resident of Chicago, in the county of Cook and State of Illinois, have invented certain new and useful Improvements in Apparatus for Making Vinegar, of which the following is a specification.

In the manufacture of vinegar from wort, wash, mash, light wines, cider, or alcoholic solutions, the general and well known practice is to feed a low grade alcoholic solution, that is distilled or otherwise obtained from products of distilleries, breweries, or yeast factories, into generators, air being supplied thereto, for the purpose of converting the alcoholic solution into vinegar. The apparatus and processes used prior to my invention are, in my opinion, uncertain, wasteful and require expert attention and in other particulars are not as perfect as they should be.

My invention provides means whereby the aldehydic vapors that are usually lost are condensed and are carried to the supply or charging tank. Each of the vertical series of generators are connected, so that any set of a vertical series may be cut out without interfering with the other generators, and in order to bring the manufacture to a point where the production of vinegar may be profitably carried on at all seasons of the year, independent of external temperatures, air at a temperature of the atmosphere is forced or drawn into each individual generator, and means are provided to supply each particular generator with the amount of air requisite to produce the best result.

The apparatus invented by me for the production of vinegar not only effects a saving as to time, and dispenses to a great extent with expert labor, but also results in a material increase in the product, the product is not contaminated by foreign matter or germs that are present in vinegar that is manufactured in open generators or with generators that are supplied with air in the usual manner, further a vinegar plant made in accord with my invention may be closed down for a long period without deleteriously affecting the shavings or packing in the generators.

The drawing shows a vertical section of a vinegar plant or apparatus made in accord with my invention, such drawing showing three vertical series of generators, whereas in actual use a plant or factory may have ten or more rows of generators on each floor.

The floors 1, 2 and 3 upon which the generators are placed have platforms 4, 5 and 6 which are placed so that the attendants may easily reach the valves and the tops of the generators, and below the floor 1 there is a tank 7 for the reception of the finished product. A tank 8 is also located below the floor 1 and said tank has a coil through which water or other cooling medium is passed; or other means as double walls may surround the tank 8 for the purpose of lowering the temperature within the tank below seventy degrees. The tank 8 has a vent which is closed by a flap or ball, and such tank is connected by a pipe 9 to the barrel of a pump 10.

The generators 11, which are sometimes designated as graduators or acidifiers, that are supported by the upper floor 3 are connected by branch pipes having valves 12 with a pipe that leads to the supply tank 13, or the branch pipes may enter kegs of sufficient size to hold a charge of liquid, the kegs being filled from the supply or charging tank 13. The generators 14 and 15 on the second and first floors are in vertical alinement with the upper generators 11, and all the generators are of similar construction, each generator having below the tight top a perforated distributing board 24, a pipe 25 for charging, a pipe 18 for the discharge of aldehydic vapors, and an opening 26 that is closed by a suitable and readily removable plug, or in lieu of the plug with a spigot, the opening being merely for test purposes. The upper generator 11 is connected with the second generator 14 by a valved pipe 27, the second generator being connected with the third generator by similar connections 28, the last of the series having tubes that are coupled to a pipe 16 that leads into the receiving tank 7.

The pipes 17 connect with the pipes that enter the upper ends of the generators, such pipes 17 are connected with a pipe 18 that enters the receiver 8. Each generator has an air inlet pipe 19, which enters near the bottom of the generator, such pipe having valves and beyond the valve these pipes are connected with an air supply pipe 20, such pipe receiving a supply of air under pressure, the same being connected to a pump or blower 21 that receives air from a filter 22. The pump 10 and the blower are driven in any suitable manner, and one may be coupled to the other by a driving belt as shown by dotted lines. Each pipe leading to and from the generators has a cut off valve so the amount of air supplied to each generator may be varied as required, the proper amount being ascertained by removing the plug that is used to close the opening in the top, and testing as to the temperature of the aldehydic vapors that escape through the opening. The supply pipe from the tank 13 and the pipes leading to the generators on the upper floor have cut-off valves and the discharge pipes are also provided with valves or spigots so that any particular vertical series of generators may be cut out.

When the valves are properly adjusted the charge admitted into the upper generators passes by gravity through the beechwood shavings with which the generators are packed, and passes from the upper generator to the intermediate one and from thence to the last of the vertical series, the product being delivered into the receiving tank 7.

In the practice of my invention the generators are made ready for use in the usual manner, that is to say by charging the generators with vinegar and an alcoholic solution, about equal parts as to volume of each, in order to saturate the porous shavings in the generators so that bacteria will propagate thereon, such bacteria being present in the original charge, as is well understood by those skilled in the art. When the generators have been prepared and it is desired to start the plant, low-grade alcohol, that is the alcoholic solution which contains not more than 25% alcohol is admitted from the supply tank, or from chargers, into the upper generators, this alcoholic solution is distributed upon and trickles over the shavings, air at the temperature of the atmosphere is forced into the lower portion of the generators and oxidizes the alcohol which raises the temperature in the generators so that aldehydic vapors will be given off, and by the combined action of the bacteria and the air, two parts of hydrogen are evolved from the alcohol and are replaced by two parts of oxygen, converting the alcoholic solution into vinegar. The liquid supplied to the first generators usually consists of a solution comprising about 25% of alcohol, and as it passes through the first generator the temperature is raised to about ninety degrees Fahrenheit, the oxidation of the alcohol producing aldehydic vapors that pass from the generators to the pipe 18 and through such pipe to the tank 8 in which they are condensed, the temperature in the tank being maintained below seventy one degrees. When the charge settles to the bottom of the first generator it is admitted or allowed to pass to the second generator, the action being repeated the temperature in the second generator being maintained at about eighty degrees, and in the lower generators the temperature will be about seventy-six degrees, showing that the major portion of the alcohol in the original solution has been converted into vinegar. The aldehydic vapors which have been collected and condensed are carried by the pipe 9 to the pump 10 and from the pump through the pipe 29 to the supply tank and are intermixed with the alcoholic solution or low wine from which the vinegar is made. In practice a much larger charge is admitted to the generators than is usually practiced with the apparatus in general use for the addition of the aldehyde to the low wine gives additional material upon which the bacteria feed.

The saccharomyces, micrococcus-aceti or bacteria which produce or assist in producing acetous fermentation are propagated in the usual way on the beechwood shavings with which the generators are packed, and when it is desired to put any or all of the generators out of use all the valves in the pipes leading to that generator are closed to prevent air entering the generator that is placed out of use, the closing of the generator causes fermentation to cease, destroys the bacteria and prevents saprophytic germs finding their way into the generator, and in this way provision is made for shutting down the plant or factory and for starting up again without the necessity of resouring or of repacking the generators.

In use the air supplied to the generators is filtered, and when the temperature is above seventy degrees Fahrenheit, the air may be cooled, before being admitted to the generators, so that fermentation may proceed irrespective of the external temperature. The generators being closed as to outside air during the process of manufacture germs that are foreign to alcoholic fermentation are excluded and the product is purer and better than that made in open generators.

The apparatus may be varied as to the manner of charging the upper generators, and if desired the aldehydic vapors may be drawn from the upper ends or tops of the first generators, to produce therein a partial vacuum, and when such arrangement is used the pump or blower 21 is dispensed with, and the pipe from the pump 10 is connected with the air pipe 20, the pipe 9 being connected above the normal level of the aldehyde in the tank 8.

In an apparatus of the character set forth the pipes, cut-offs or valves and parts which the vinegar comes in contact with are made of wood, leather and glass, no metal being used. It is not essential that the generators should be positioned directly one above another, but such arrangement is preferred as it reduces the amount of piping, and my process may be carried out by use of pumps with the generators arranged on the same horizontal plane or on one floor.

I claim.

1. In a vinegar apparatus, a plurality of closed generators each generator being partially filled with shavings, a supply tank that is connected to the upper generator by a pipe that enters the same above the level of the shavings, pipes that enter the lower portion of each of the generators, a pump for forcing air through the pipes and into the generators, pipes having valves therein such pipes extending from the bottom of one generator to the top of the next generator beneath, a pipe connected by branch pipes to the upper portion of each generator, a condenser into which the pipe that is connected to the upper portion of each generator enters and means for returning the condensed products to the supply tank, substantially as shown.

2. In a vinegar apparatus, a vertical series of generators which are maintained on different horizontal planes, a supply tank located at a higher elevation than the upper generator, a supply pipe from the tank and valved connections between the supply tank and the upper generator, a perforated distributing board above the packing for the generators, an air supply pipe, an air filter to which the air supply pipe is connected, branch pipes from the air supply pipe to the lower portion of each generator, valves in the branch pipes for regulating the amount of air supplied to each generator, exit pipes that enter the generators above the packing and distributing boards, and a condenser into which the vaporized products are carried, substantially as set forth.

3. In a vinegar apparatus, a plurality of generators maintained on different horizontal planes and connected one to the other, means for charging the upper generator with an alcoholic solution, means for supplying air at normal temperature and under pressure into the lower portion of each generator, means for conveying the liquid from the upper generator to the next generator below and from thence to a third generator, pipes connected to the upper portion of each generator for conveying aldehydic vapors therefrom, and a condenser into which the aldehydic vapors are discharged.

4. In an apparatus of the character set forth, a supply tank, a vertical series of three closed generators, an air supply pipe, connections extending therefrom to each of the generators, means for forcing air under pressure through said pipes into each generator, means for connecting the upper generator with the supply tank and to the next lower generator; such second generator being similarly connected to the lower generator so that the liquid taken from the supply tank may pass by gravity from one generator to another to subject the liquid or primary charge to three successive fermentations, pipes that enter the upper ends of each generator, such pipes being attached to a pipe that leads to a condenser; wherein the aldehydic vapors as produced in each of the generator is collected and means for conveying the liquefied products to the supply tank.

5. In the art of manufacturing vinegar from alcoholic solutions, a supply tank for the solution, air tight generators which are each partially filled with shavings, pipes that lead from the supply tank to the upper generators, outlet pipes from the upper ends of the generators to a condenser, valved pipes that enter the lower ends of the generators, means for forcing filtered air through said pipes and into the generators and connections between the upper generators and other similar generators, substantially as set forth.

6. In a vinegar apparatus, a plurality of generators which are connected one to the other, means for charging one of the generators with an alcoholic solution, means for supplying air at normal temperature and under pressure into the lower portion of each of the generators, means for conveying the liquid from one of the generators to the others, pipes connected to the upper portion of each generator for conveying aldehydic vapors therefrom, and a condenser into which the aldehydic vapors are discharged.

7. In a vinegar apparatus, a supply tank, a plurality of generators arranged in vertical and horizontal series, a pipe for supplying each of the upper series of generators with an alcoholic solution, valved connections between the generators and the supply pipe, valved pipes for connecting the upper generators with those on a lower level so that the liquid may flow from the upper into the lower generators, an air supply pipe connected with a blower for forcing air under pressure into each of the generators, valves in the pipes that lead from the air supply pipe for regulating the amount of air fed to each particular generator, exit pipes that enter the upper ends of the generators said pipes being connected to a pipe that enters a condenser, a pipe that leads from the condenser to a pump and from the pump to the supply tank, substantially as shown and for the purpose set forth.

EUGENE A. SPINK.

Witnesses:
EUGENE W. JOHNSON,
WM. J. NEAL.